(12) United States Patent
Hamaguchi

(10) Patent No.: US 6,604,680 B2
(45) Date of Patent: Aug. 12, 2003

(54) AUTOMATIC TRANSACTION SYSTEM

(75) Inventor: Yoshitaka Hamaguchi, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/304,996

(22) Filed: Nov. 27, 2002

(65) Prior Publication Data

US 2003/0127510 A1 Jul. 10, 2003

(30) Foreign Application Priority Data

Jan. 8, 2002 (JP) ........................................ 2002/001335

(51) Int. Cl.⁷ .............................................. G06F 17/60
(52) U.S. Cl. ......................................... 235/379; 235/380
(58) Field of Search ................................. 235/379, 380

(56) References Cited

U.S. PATENT DOCUMENTS

RE30,773 E  * 10/1981 Glaser et al. ............... 235/379

FOREIGN PATENT DOCUMENTS

JP          06-096330          4/1994

* cited by examiner

*Primary Examiner*—Harold I. Pitts
(74) *Attorney, Agent, or Firm*—Rabin & Berdo, P.C.

(57) ABSTRACT

An automatic transaction system is provided which is capable of easily transmitting money between a payer or a recipient even if the recipient has no account in a financial institution. The automatic transaction system includes an automatic teller machine (ATM), a terminal, and a connecting device. The automatic transaction system is made up of a storing section, an obtaining section, and a communicating unit. The connecting device has a destination designating section. The terminal has a recognizing unit, an inputting section, and a communicating section.

8 Claims, 5 Drawing Sheets

AUTOMATIC TRANSACTION SYSTEM

BACKGROUND OF THE INVENTION

1. Field of the Invention

The present invention relates to an automatic transaction system using an automatic teller machine (ATM) and more particularly to the automatic transaction system to transmit money between a recipient and a payer.

2. Description of the Related Art

A money transmission process using a conventional ATM is described below by referring to FIG. 5. Conventionally, a recipient has an account at one financial institution. A payer performs, by using the conventional ATM, a money transmission process either to transfer a deposit in himself/herself account or to transfer a cash into the account of the recipient (hereinafter, such money transmission process is called a "money transfer").

The recipient checks to see, by using an ATM, whether money is added to his/her account by the money transfer as described above. The recipient, when money is added to his/her account, receives cash by a money drawing process.

However, in such the conventional money transmission process, each of the payer and the recipient has to visit a financial institution in order to perform a money transmission process or in order to check whether or not money has been added in his/her account, as a result, causing the money transmission process to be complicated.

Moreover, the conventional automatic transaction system presents a problem in that, unless a recipient has his/her own account in an financial institution, it is impossible for a payer to perform a money transfer.

SUMMARY OF THE INVENTION

In view of the above, the object of the present invention is to provide an automatic transaction system, which is capable of making easy a money transmission process between a payer and a recipient, and of making the recipient get cash if the recipient has no account.

According to an aspect of the present invention, there is provided an automatic transaction system including:

an automatic teller machine (ATM) to be used by a recipient to have a payer transmit an amount of money to be transferred from an account of the payer;

a terminal to be used by the payer for money transmission;

a connecting device to connect the ATM to the terminal; and wherein the ATM is provided with a storing section to store designation information to designate oneself, an obtaining section to obtain designation information to designate the terminal and recognition information to recognize the recipient, and a communicating unit and wherein the connecting device has a destination designating section to designate the ATM and the terminal, based on the designation information and identification information, and to establish connection so as to receive each piece of information, and wherein the terminal is provided with a recognizing unit to have, when the recognition information is received, a recipient recognized based on the recognition information, an inputting section to have the payer input account information including an amount of money, and a communicating unit to transmit the account information to the connecting device to further transfer the account information to the ATM.

As described above, the automatic transaction system of the present invention, includes the automatic teller machine (ATM) to be used by a recipient and a terminal is used by a payer. The connecting device, based on designating information and identifying information, identifies the ATM and terminal for connection. The terminal receives recognition information and has a payer recognize a recipient and has an account information including transmitting amount of money be input and then transmits the information to the ATM through the connecting device. When the account information of a payer is transmitted to the ATM, if a recipient has no account, the ATM, based on account information of the payer, performs a process of drawing cash corresponding to the transmitting amount of money for the recipient. Therefore, even if a recipient has no account, the recipient can receive cash from an account of a payer by using the ATM. Moreover, if a recipient has an account, the ATM does not perform a money drawing process but performs, based on account information of a payer, a process of adding money corresponding to a transmitting amount to an account of the recipient and has the recipient confirm the addition of money.

Thus, money transmission between a payer and a recipient can be achieved not by payer's use of the ATM but by payer's use of a terminal and only by recipient's use of the ATM. In such case, the recipient can either receive cash if no account or confirm whether the money was deposited into own account. As a result, it is possible to simplify each transaction process for transmitting money.

As the terminal, a portable cellular phone or a personal computer can be used. Therefore, even if a payer lives at a remote site, money transmission is made possible.

As the recognition information, a PIN can be used. In this case, the obtaining section serves as an inputting section to input both designating information and PIN to a recipient's device and the recognizing unit serves as a display section to display the PIN. By this PIN, an authorized recipient can be recognized.

Moreover, as recognition information, voice data can be used. In this case, the obtaining section is made up of an inputting device to input designating information to a device of the recipient and a voice obtaining section to obtain voice data based on a voice of the recipient. The recognizing unit is a voice reproducing section to reproduce a voice of a recipient based on received voice data. This enables an authorized recipient to be recognized only by a voice without a need of memorizing a PIN.

Furthermore, as recognition information, image data can be used. In this case, the obtaining section is made up of an inputting section to have a recipient input designating information and an image obtaining section to obtain image data indicating an image of the recipient and a display section to reproduce an image of the recipient, based on received image data, serves as a recognizing unit. This enables a payer to recognize a recipient by an image and to perform an exact transmission of money.

Also, in the automatic transaction system, the ATM more may be provided with a payment processing section for paying cash to said recipient based on said account information output from said connecting device; and the terminal may be Personal Digital (Data) Assistants (PDA) with a function capable of connecting to network.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Configurations of an automatic transaction system of a first embodiment will be described below by referring to FIG. 1.

Figure 1:
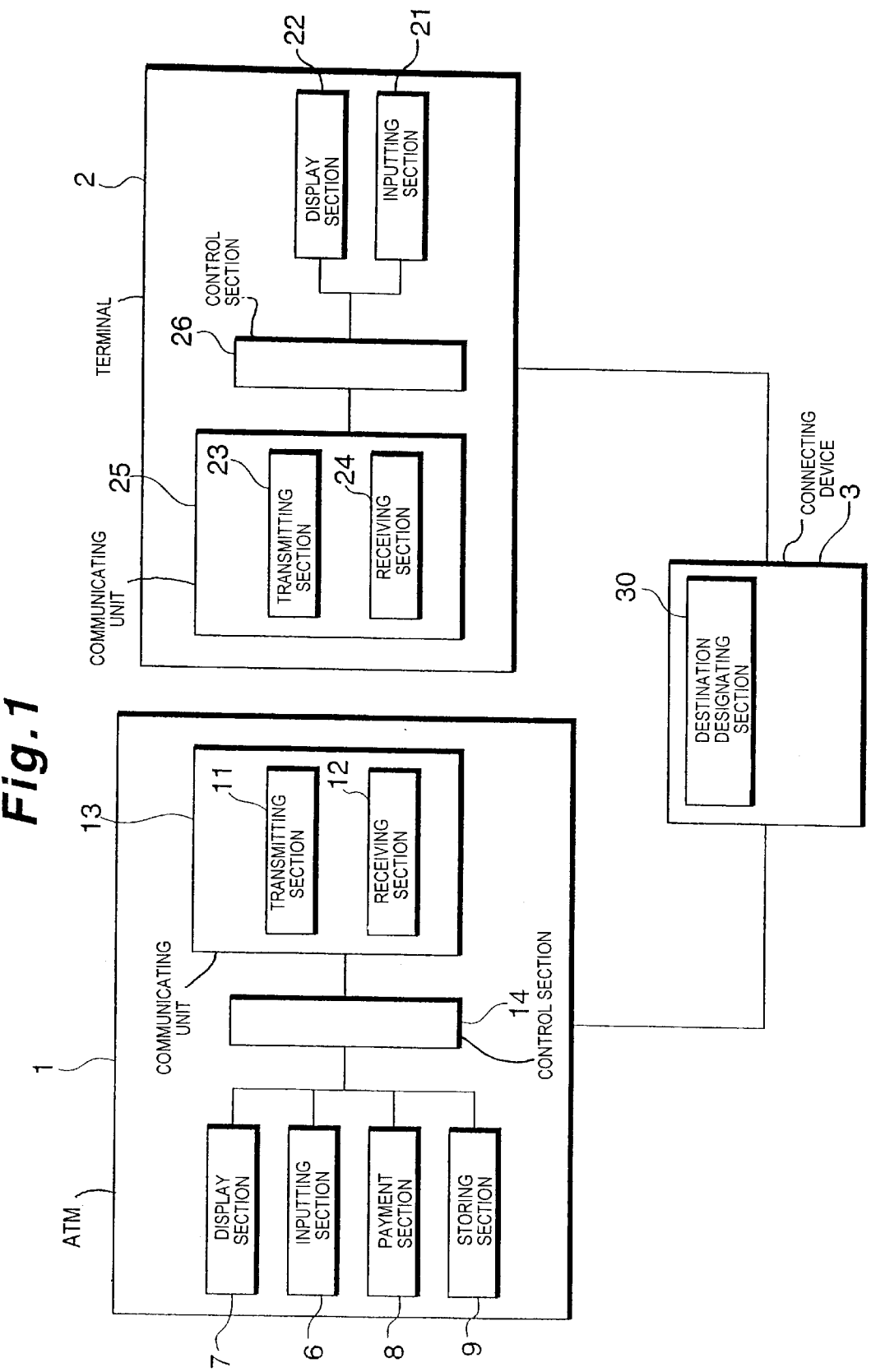
FIG. 1 is a schematic block diagram showing configurations of an automatic transaction system according to a first embodiment of the present invention.

As shown in FIG. 1, the automatic transaction system of the first embodiment includes an ATM 1 to perform various transactions such as a money receiving and a money drawing process; a terminal 2 made up of a portable cellular phone, or a personal computer such as note personal computer or handheld personal computer, or a PDA capable of connecting with network by wireless communication, or a like; a connecting device 3 to connect the automatic transaction system to the ATM.

The ATM, as shown in FIG. 1, has an inputting section 6 to receive an input of information required for transaction, a display section 7 to display input information, guiding sentences for operations of the ATM 1, or a like, a payment processing section 8 to perform a cash paying process, a storing section 9 to hold various pieces of information including information to designate the ATM 1 (hereinafter the information being called "ATM designating information"), a communicating unit 13 made up of a signal transmitting section 11 to transmit information and a signal receiving section 12, and a control section 14 to exert control on each of components described above.

The terminal 2 has an input section 21 to receive an input, a display section 22 to display input information, guiding sentences for operations, or a like, a communicating unit 25 made up of a signal transmitting section 23 to transmit information and a signal receiving section 24 to receive signals, and a control section 26 to exert control on each of the components described above.

The connecting device 3 has a destination designating section 30 to identify a communicating unit including a telephone line, internet line, Web server, Web browser, or a like and each section in the ATM to be connected and each section in the terminal 2 to be connected in order to establish connection among them.

Next, operations of the automatic transaction system having configurations described above will be explained by referring to FIG. 2. In the embodiment, let it be assumed that the terminal 2 is, for example, a portable cellular phone. The portable cellular phone has a internet function capable of connecting with network.

Figure 2:
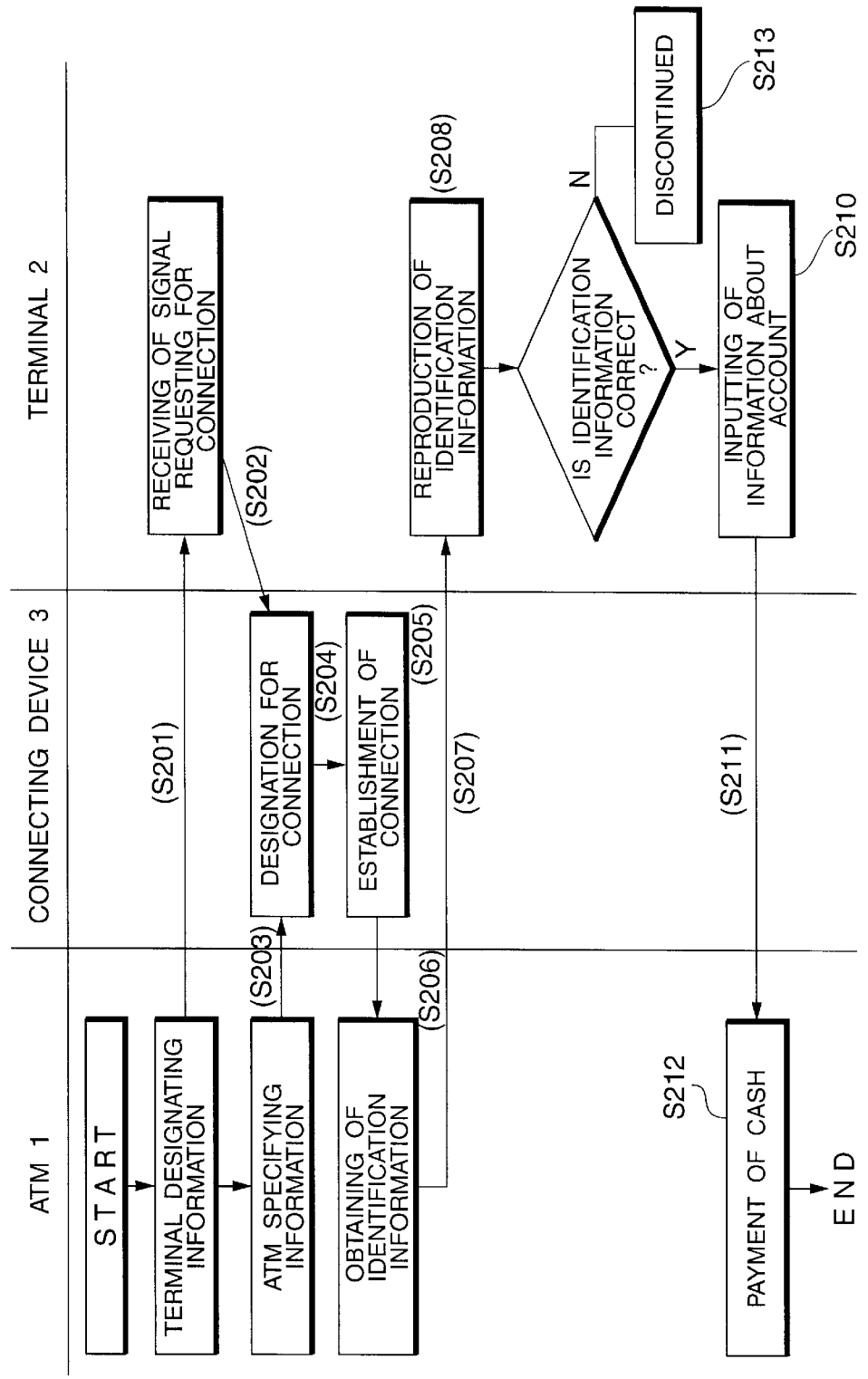
FIG. 2 is a flow chart explaining a money transmission process according to the first embodiment of the present invention.

FIG. 2 is a flow chart explaining a money transmission process according to the first embodiment. That is, a recipient of cash, by using the ATM 1, select an item "cash receiving" out of transaction items being displayed on the display section 7 and inputs a portable cellular phone number through the inputting section 6.

Moreover, information such as a portable cellular phone number used to designate the terminal 2 of a payer is used as terminal designating information.

When a telephone number being terminal designating information is input through the inputting section 6 serving as a section to acquire information, the signal transmitting section 11 in the ATM 1 transmits a signal requesting for connection to the terminal 2 (Step S201).

Moreover, in the ATM 1, ATM specifying information is read from the storing section 9 which is transmitted to the destination designating section 30 in the connecting device 3 (S203). In the connecting device 3 having received the ATM specifying information transmitted from the ATM 1 and information about a report that a request for connection transmitted from the terminal 2 has been received, the destination designating section 30 operates to designate a destination to be connected by the ATM 1 and the terminal 2 (S204) and establishes connection (S205).

Then, a message or a like to prompt a use of a PIN (Personal Identification Number) having been designated in advance by both a payer and a recipient to be input is displayed on the display section 7 and, when the PIN is input (S206), the PIN is transmitted through the connecting device 3 to the terminal 2 (S207). Moreover, in Step S206, the PIN to be input is identification information which is used by a payer to identify a recipient and, in the embodiment, the PIN is employed as an example.

The terminal 2 having received a PIN transmitted from the ATM 1 from the signal receiving section 24 displays the received PIN serving as an identification unit (S208).

A payer identifies a PIN displayed on the display section 22 (S209) and, if the PIN matches the PIN designated in advance by both the payer and the recipient, inputs information about an account such as an account number, an amount of money to be transmitted through the input section 21 (S210).

The input information about an account is transmitted by the signal transmitting section 23 through the connecting device 3 to the signal receiving section 12 (S211) and cash is paid to a recipient from the payment processing section 8 (S212). Moreover, in Step S209, the PIN displayed on the display section 22 differs from the PIN designated in advance by both the payer and the recipient, the transaction is discontinued (S213).

Thus, according to the first embodiment, a payer can transmit money only by using his/her portable cellular phone without payer's direct manipulation of the ATM 1. Therefore, even if a payer exists at a distant location, transmission of money between a payer and a recipient can be easily performed. Moreover, a payer can transfer money to even a recipient having no account in a financial institution. Furthermore, connection between the ATM 1 and the terminal 2 can be achieved not only by the processes described above but also by processes explained below.

That is, when a recipient inputs a telephone number as terminal designating information, the ATM 1 reads ATM specifying information being stored in the storing section 9 and transmits a telephone number of a terminal 2 and the ATM specifying information to the connecting device 3. The connecting device 3 having received the telephone number of the terminal 2 and the ATM specifying information from the ATM 1 accesses the terminal 2 designated by the ATM 1 and makes a request for connection.

Then, when a report of receiving the request for connection is transmitted from the terminal 2 to the connecting device 3, connection between the ATM 1 and the terminal 2 is established.

Second Embodiment

In a second embodiment, a voice is used as recognition information for a payer to identify a recipient.

Figure 3:
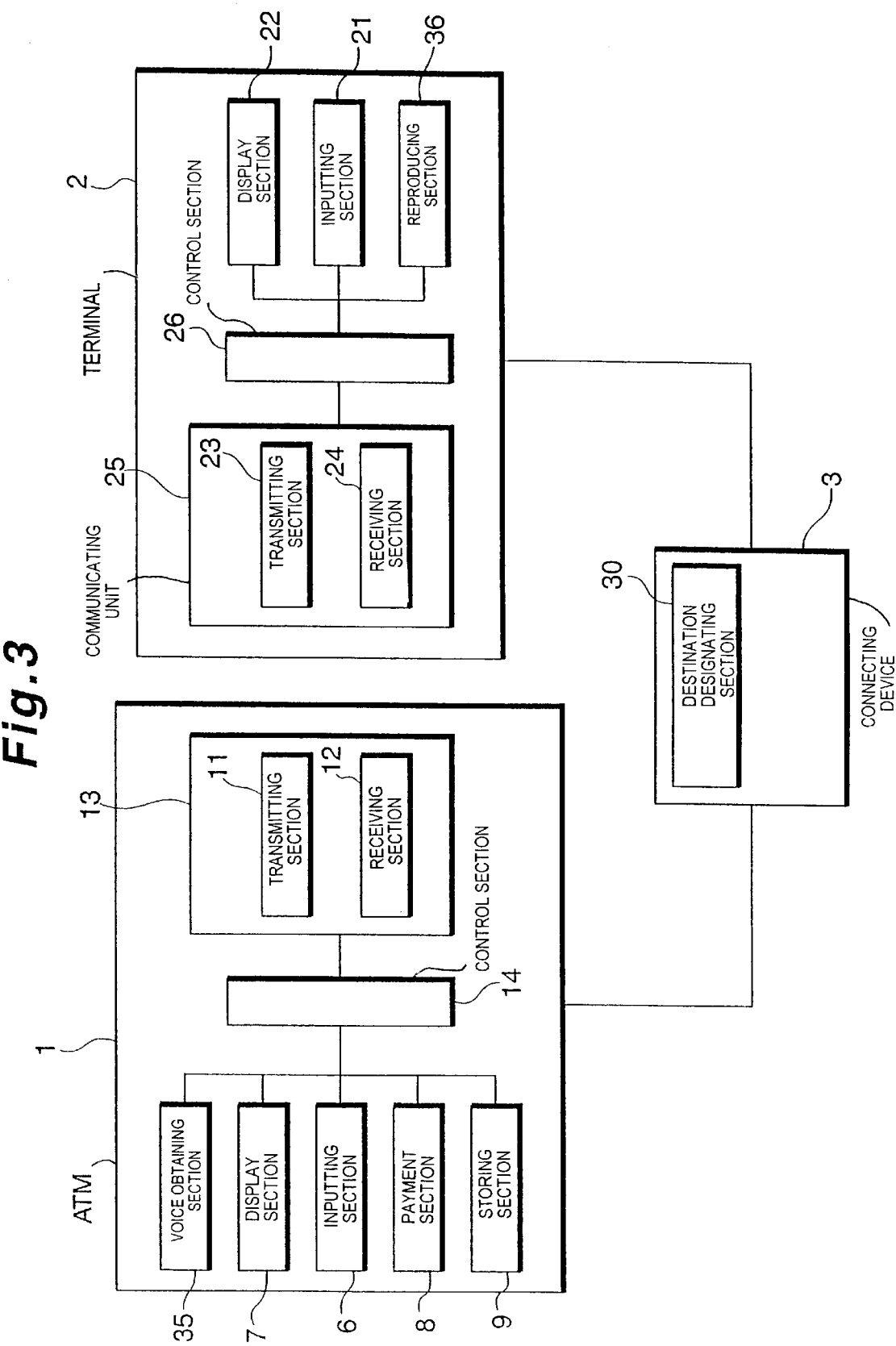
FIG. 3 is a diagram explaining configurations of an automatic transaction system employed in a second embodiment of the present invention.

FIG. 3 is a diagram explaining configurations of an automatic transaction system employed in the second embodiment of the present invention.

As shown in FIG. 3, a voice obtaining section 35 is newly added to components mounted in the ATM 1 employed in the first embodiment and a voice reproducing section 36 is newly placed to components mounted in the terminal 2 employed in the first embodiment.

In the second embodiment, an inputting section 6 and the voice obtaining section 35 make up an obtaining section (not shown) and the voice reproducing section 36 is used as a recognizing unit.

The voice obtaining section 35 is, for example, a voice gathering device such as a microphone adapted to obtain voice data based on a voice of a recipient. The voice reproducing section 36 is, for example, a voice reproducing device such as a speaker adapted to reproduce a voice of a recipient based on received voice data.

Next, operations of the automatic transaction system of the second embodiment having configurations describe above are explained.

That is, as shown by the flow chart in FIG. 2, after the connection has been established between a recipient and a payer in Step S205, the recipient issues a voice in accordance with an operation guidance displayed in the display section 7 of the ATM 1. A voice issued by the recipient is obtained by the voice obtaining section 35 and is transmitted by the signal transmitting section 11 to the terminal 2.

The signal receiving section 24 in the terminal 2 receives a voice of a recipient transmitted from the ATM 1 and reproduces a voice by using the voice producing section 36. A payer confirms a voice of the recipient and performs a money transmission process in Steps S209 to S213 shown in FIG. 2. Thus, according to the information processor of the second embodiment, since memorizing a PIN is not required and since a recipient can be recognized by using voice data available at the site, it is possible to easily perform money transmission.

Moreover, a money transmission process can be performed to a recipient having no account in a financial institution.

Third Embodiment

Figure 4:
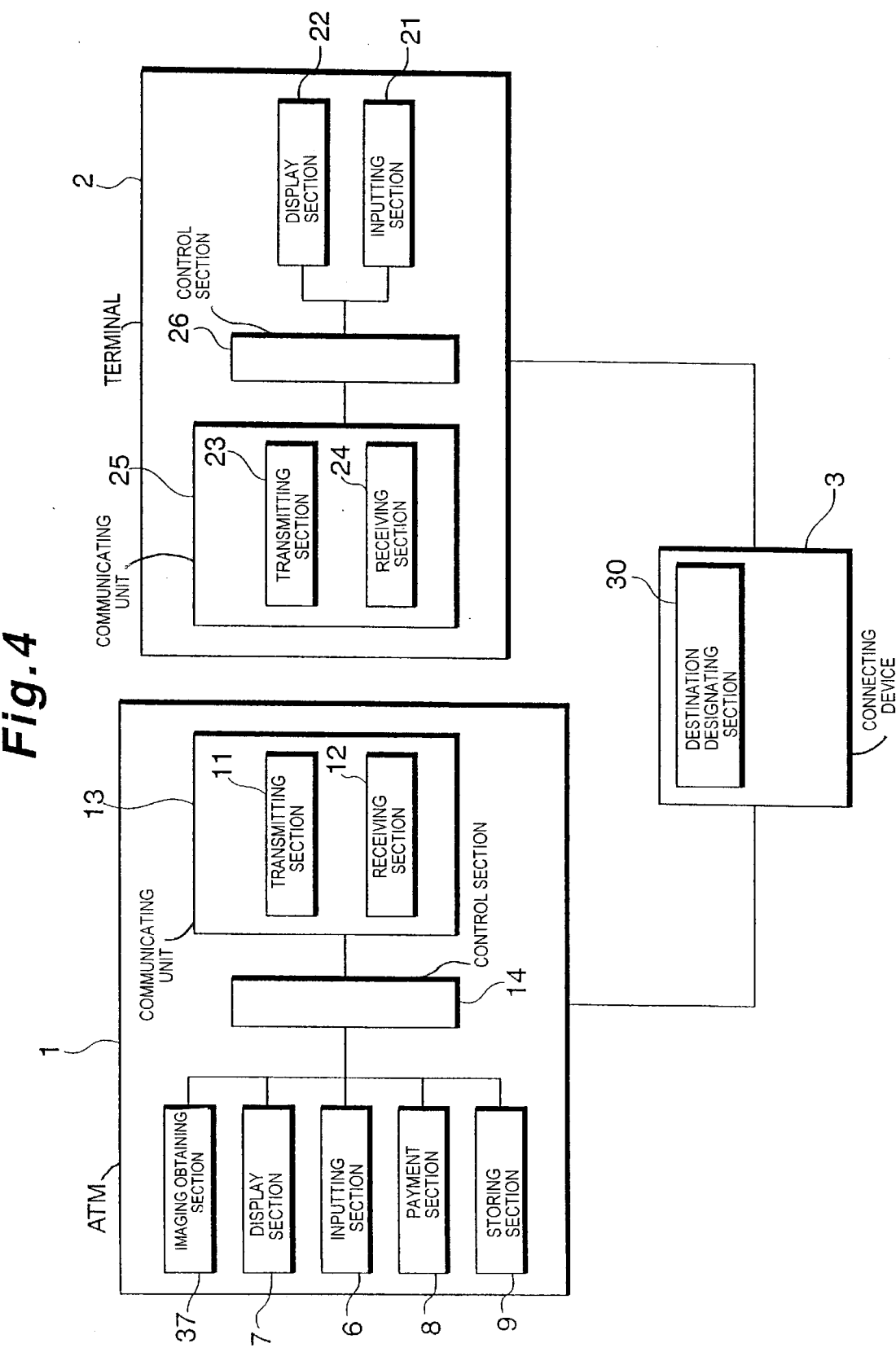
FIG. 4 is a diagram explaining configurations of an automatic transaction system according to a third embodiment of the present invention.
Figure 5:
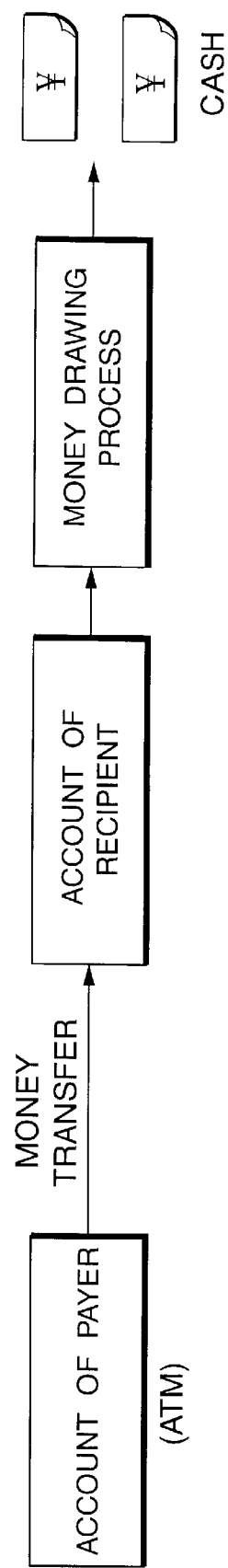
FIG. 5 is a diagram showing a money transmission process employed in a conventional technology.

In a third embodiment, recognition information for a payer to recognize a recipient is used as an image of a recipient. FIG. 4 is a diagram explaining configurations of an automatic transaction system according to the third embodiment of the present invention. In configurations of the third embodiment, as shown in FIG. 4, an image obtaining section 37 is added to components employed in the ATM 1 of the first embodiment. The image obtaining section 37 is, for example, a camera adapted to obtain an image of a recipient. In the third embodiment, an inputting section 6 and the image obtaining section 37 make up an obtaining section (not shown).

Moreover, a display section 22 in a terminal 2 is adapted to display an image used as a recognizing unit which is obtained by the image obtaining section 35.

Next, operations of an information processor of the third embodiment having configurations described above will be described. That is, in a flowchart shown in FIG. 2, connection has been established between a recipient and a payer (Step S205), an image of the recipient is obtained by the image obtaining section 37 in the ATM 1.

The image obtained by the recipient is transmitted by a signal transmitting section 11 to a terminal 2. A signal receiving section 24 in the terminal 2 receives the image of the recipient transmitted from the ATM 1 and reproduces it by using the display section 22. The payer confirms the image of the recipient and performs a money transmission process in accordance with Steps 209 to S213 shown in FIG. 2.

Thus, according to the third embodiment, since a recipient is recognized by image data identifying the recipient, more exact money transmission is made possible.

It is thus apparent that the present invention is not limited to the above embodiments but may be changed and modified without departing from the scope and spirit of the invention. For example, in the above first to third embodiments, as recognition information, a PIN, a voice or an image of a recipient is used, however, confirmation of a recipient may be performed by using an iris or a fingerprint.

Moreover, a recipient may have an account in a financial institution. In this case, the ATM may perform a money adding process to an account of the recipient, not performing a money drawing process to pay cash to a recipient.

With the above configuration, in a word, money transmission between a payer and a recipient can be easily performed. It is made possible to transmit money to a recipient even if he/she has no account in a financial institution.

What is claimed is:

1. An automatic transaction system comprising:
   an automatic teller machine (ATM) to be used by a recipient to have a payer transmit money corresponding to an amount of money to be transferred from an account of said payer;
   a terminal to be used by said payer for money transmission;
   a connecting device to connect said ATM to said terminal; and
   wherein said ATM is provided with a storing section to store specifying information to specify oneself, an obtaining section to obtain designating information to designate said terminal and identifying information to identify said recipient, and a communicating unit for transmitting said specifying information, said designating information and said identifying information to connecting device;
   said connecting device has a destination designating section to designate said ATM and said terminal, and make the designated said ATM and said terminal connect for transmitting and receiving any information between said ATM and said terminal, based on said specifying information and said designating information;

said terminal provided with a identifying unit to make, when said identifying information is received, said payer identify said recipient based on said identifying information, an inputting section to have said payer input account information including an amount of money, and a communicating unit to transmit said account information to said connecting device for further transferring said account information to said ATM.

2. The automatic transaction system according to claim 1, wherein said terminal is a portable cellular phone.

3. The automatic transaction system according to claim 1, wherein said terminal is a personal computer.

4. The automatic transaction system according to claim 1, wherein said identifying information is a personal identification number (PIN); said obtaining section serves as an inputting section to have said recipient input said designating information and said PIN; and said identifying unit serves as a display device to display said PIN.

5. The automatic transaction system according to claim 1, wherein said identifying information is voice data; said obtaining section is made up of an inputting section to have said recipient input said designating information and a voice obtaining section to obtain said voice data based on a voice of said recipient; and said identifying unit serves as a voice reproducing section to reproduce a voice of said recipient based on said voice data received by said communicating unit of said terminal.

6. The automatic transaction system according to claim 1, wherein said identifying information is image data; said obtaining section is made up of an inputting section to have said recipient input said designating information and an image obtaining section to obtain said image data indicating an image of said recipient; and said identifying unit serves as a display section to reproduce said image of said recipient based on said image data received.

7. The automatic transaction system according to claim 1, wherein said ATM more is provided with a payment processing section for paying cash to said recipient based on said account information output from said connecting device.

8. The automatic transaction system according to claim 1, wherein said terminal is Personal Digital (Data) Assistants (PDA) with a function capable of connecting to network.

* * * * *